Oct. 16, 1951 A. F. WELCH 2,571,507
PRESSURE INDICATOR
Filed June 6, 1950

Inventor
Albert F. Welch
By Willits, Helwig & Baillio
Attorneys

Patented Oct. 16, 1951

2,571,507

UNITED STATES PATENT OFFICE 2,571,507

PRESSURE INDICATOR

Albert F. Welch, Detroit, Mich., assignor to General Motors Corporation, Detroit, Mich., a corporation of Delaware Application June 6, 1950, Serial No. 166,524

11 Claims. (Cl. 315—32)

1

This invention relates to a pressure indicator and particularly to an indicator comprising a pressure-responsive condenser mounted within a spark plug bore.

A principal object of the invention is to provide a pressure-indicating pickup unit of the electric capacity type which is adapted to be used in a suitable electric circuit for qualitative and quantitative measurements of static and dynamic pressures. The indicator provided by this invention is especially suitable where small size of pickup and high speed response are of importance, as is the case in measuring and recording rapidly fluctuating pressures in combustion chambers of internal combustion engines.

In the past, employment of indicating mechanisms in which the capacity effect of a condenser was utilized to indicate some change in condition, such as a pressure change within a combustion chamber of an internal combustion engine, required a special opening in the engine head for the insertion of a pressure-measuring unit. This, in turn, necessitated rework of the engine head, often a difficult operation. Inasmuch as an additional opening also necessarily affects combustion characteristics of the air and fuel mixture by substantially altering the volume of the combustion chamber or by impeding flame travel due to the projection of the pressure-measuring unit into the combustion chamber, the possibility of very exact pressure measurement is thereby precluded.

It is therefore another object of the invention to provide an indicating device which eliminates this need for a special opening in a wall of an engine combustion chamber and which accordingly permits more exact measurement of pressure.

Furthermore, with the elimination of the necessity for drilling separate openings in the head of every engine which it is desired to test, the inventive pressure-indicating device can be used on any engine without previous preparation by merely installing in the usual manner the modified spark plug containing the indicator. This construction permits the same spark plug unit to simultaneously fire the engine and measure pressure changes within the combustion chamber. The engine, of course, is unaffected by the installation of the device.

A further object of the invention is to provide a pressure-indicating device which may be incorporated in the spark plug of an internal combustion engine and which exposes to the cylinder pressure a condenser comprising a fixed conductive member and a pressure-responsive deformable conductive member separated by an elastic dielectric, whereby changes in pressure will be indicated by the resulting changes in the capacitance of the condenser due to variation in the distance between conductive members.

Changes in the capacitance of the indicator may influence any suitable recording devices, such as meters or oscillographs, in a known manner.

Other objects and advantages of the invention will more fully appear from the following description of the preferred embodiments of the invention shown in the accompanying drawing, in which.

Figure 1:
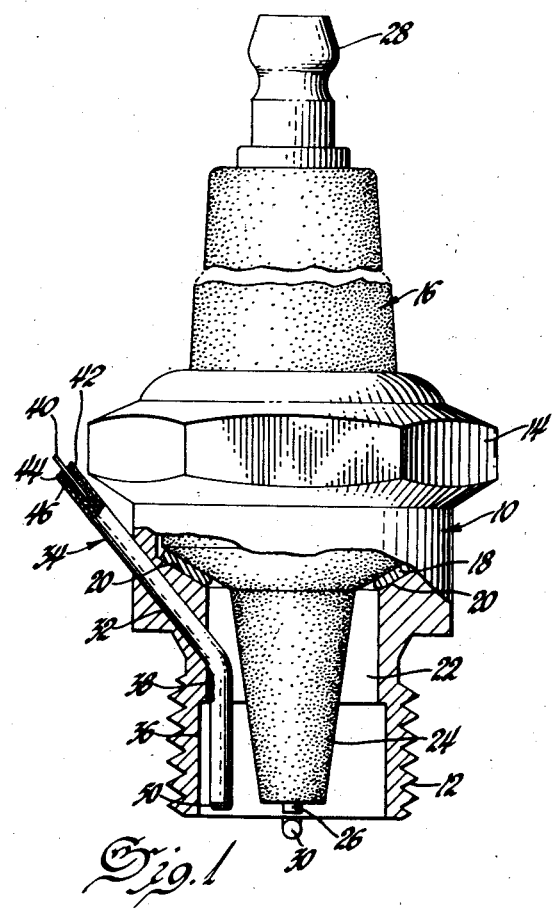
Figure 1 is a vertical view, partly in elevation and partly in section, of a spark plug provided with a pressure indicator embodying the invention.
Figure 2:
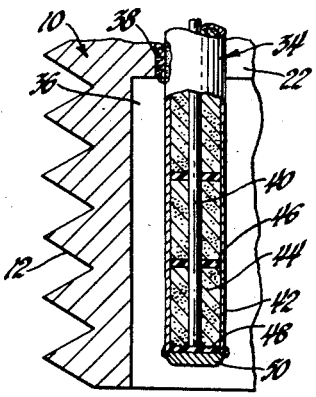
Figure 2 is an enlarged sectional view of the pressure-indicating condenser shown in Figure 1.
Figure 3:
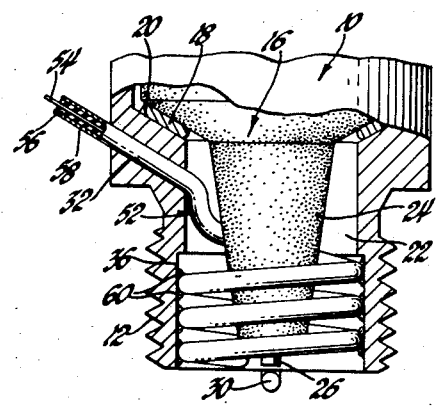
Figure 4:
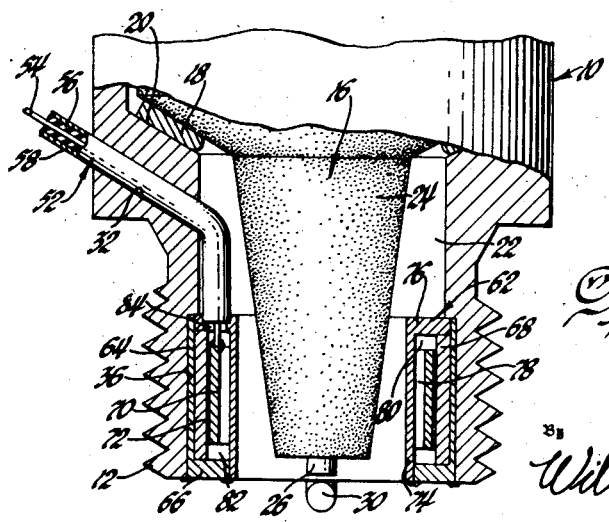

Figure 3 is a fragmentary vertical view, partly in elevation and partly in section, of a spark plug provided with a modification of the pressure indicator shown in Figures 1 and 2; and Figure 4 is an enlarged fragmentary vertical view, partly in elevation and partly in section, of a spark plug provided with a further modification of the condenser-type pressure indicators shown in Figures 1, 2 and 3.

Referring to the drawing, in Figure 1 is shown a spark plug having a metallic shell, indicated generally by 10, with its narrower lower portion provided in the usual manner with external screw threads 12 for installation of the spark plug in the head of an internal combustion engine, not shown. The upper portion of the shell is shown as having the conventional polygonal construction 14 to aid in positioning the spark plug in the engine. An insulator 16 of ceramic or other suitable material is positioned within the shell 10 and is preferably seated upon a gasket 18 which in turn is supported by the internal shoulder 20 of the shell. The shell 12 defines a central bore 22 enclosing the tapered lower portion 24 of the insulator 16, this tapered portion being spatially separated from the shell wall.

Positioned within the insulator is a central electrode 26, which projects below the lower end of the insulator. Extending from the upper end of the insulator is a contact terminal 28, which has electrical communication within the insulator with the central electrode. The ground electrode 30, projecting from the lower edge of the threaded portion of the shell 14 and extending transversely across the lower end of the spark plug, is spaced from the central electrode 26 to form a spark gap.

The shell 12 has a generally cylindrical opening 32 provided in its wall and preferably angularly arranged relative thereto, as shown in the drawing. In this opening is snugly fitted a pressure-sensitive condenser 34, which extends downwardly into the spark plug bore 22 and which may be secured to the shell wall by silver soldering, as indicated at 38, or other appropriate means. The lower portion of the shell wall is shown as having a recessed inner surface 36 providing for spatial separation of the wall from the condenser and hence exposure of the outer generally cylindrical surface of the condenser 34 to the combustion gases throughout the working length of the condenser.

This condenser, the construction details of which are best shown in Figure 2, consists principally of a stationary inner conductive rod or wire 40 and a deformable outer tubular conductive member 42 mounted concentrically therearound, the annular space interjacent these conductors being filled with a suitable elastic dielectric 44. These conductive members are electrically connected in a conventional manner to a suitable source of electric current.

In the modification of the invention shown in Figures 1 and 2, the stationary conductive rod 40 may be of nichrome or similar material while the deformable tubular member 42 is preferably constructed of nickel and is shown as having approximately a ⅛-inch outside diameter and a wall thickness in the order of 1/100 of an inch. The dielectric 44 may advantageously be powdered barium titanate or a similar substance. Axially disposed throughout the operating length of the condenser are washers 46 of mica or other suitable insulating material, which function as spacers. The preferably mica disc 48 at the end of the conductive rod 40 insulates this rod from the metallic end cap 50, which may be secured, such as by welding, to the tip of the tubular conductive member 42 to seal the end of the condenser. All the parts of the condenser indicator are accurately formed so that the stationary conductive rod 40 may be equally spaced from the deformable tubular member 42.

Inasmuch as the walls of the tubular conductive member 42 are constructed sufficiently thin to be deflected by external pressure and thus alter the capacity of the condenser 34, the capacity changes in accordance with pressure variations in the engine cylinder. As portions of the walls of the outer tubular conductive member are deflected inwardly toward the stationary conductive rod 40 by an increase in pressure, the decrease in distance between these wall portions and the rod mounted therewithin results in a capacity increase which can be measured by appropriate electrical devices. Since the percent change in the capacity of the condenser 34 is small, the change in capacity is directly proportional to the pressure.

The two conductive members are electrically connected to a suitable recording device, such as a meter or an oscillograph, for measurement of the capacitance changes.

This modification shown in Figures 1 and 2 appears to be highly advantageous because it is especially adapted to provide high sensitivity through the use of a dielectric, such as barium titanate, having a high dielectric constant, thereby insuring a large capacity change per linear distance change between the conductive members. It has been found desirable to have a condenser capacity of approximately 15 micro-micro-farads. Sensitivity of the condenser will be further increased by flattening opposite walls of the outer tubular conductive member and the inner conductive rod so as to decrease the distance between these members. This construction therefore permits the use of a shorter condenser length, thereby occupying less space and having a negligible influence upon the combustion gases of the burning fuel.

The modification of the condenser shown in Figure 3 employs a coaxial cable 52 located within the spark plug bore 22 and coiled around the tapered lower portion 24 of the insulation 16. This cable, somewhat similar to that previously described, comprises a stationary inner conductive core or wire 54 surrounded by a dielectric 56, which in turn is encased in a deformable tubular conductive member or casing 58. The stationary wire 54 is preferably constructed of a highly conductive metallic substance such as copper, while the outer tubular casing 58 may be of nickel or a similar substance. To provide rigidity to the structure the coiled tubing may be secured to the recessed inner surface 36 of the shell wall by silver soldering, as indicated at 60, or other suitable means. The end of the condenser cable is sealed and the conductive members electrically insulated from each other in a manner similar to that shown in Figure 2.

Pressure variations resulting from the expansion and contraction of the gases actuate the condenser, as hereinbefore explained, by deflecting the walls of the outer tubular conductive member 58. Accordingly, variations in distance between the conductive members 54 and 58 will be indicated by the resultant changes in condenser capacitance.

It will be noted that coiling the condenser within the spark plug bore greatly increases the effective working area of the condenser by exposing it to the compressive effects of the combustion gases throughout a large portion of its length, hence increasing the sensitivity of the condenser as a pressure-measuring device. This construction permits the use of a material such as mica as the dielectric, which may be in the form of a series of washers occupying the space interjacent the conductive members.

In the modification shown in Figure 4, the coaxial cable 52 similar to the one shown in Figure 3 is used in conjunction with an annular cylinder-type condenser, indicated generally by 62. This annular condenser includes a generally cylindrical, preferably metallic, outer sleeve or shield 64 having an inwardly extending flange 66 on its lower edge.

A cylindrical metallic supporting member 68 is snugly fitted within the outer sleeve 64 with its lower edge seated upon the flange 66. Mounted within the supporting member 68 is a stationary conductive member 70, which is preferably of a cylindrical shape and which may be secured to the supporting member and insulated therefrom by an interjacent layer of electric insulating cement 72. If such a cement is used as the insulator, a layer in the order of $15/100$ of an inch is satisfactory. The cylindrical supporting member 68 provided between the stationary conductive member 70 and the outer sleeve 64 is included to lend structural rigidity to the condenser unit and to support the stationary conductive member.

The condenser is shown as formed into a sealed unit by the addition of a generally cylindrical deflectable conductive inner wall 74 having an outwardly projecting flange 76 on its upper edge, this flange forming the top wall of the annular condenser and the flange 66 on the outer sleeve forming the bottom wall. These flanges 66 and 76 are secured, preferably by silver soldering, to the unflanged edges of members 64 and 74, respectively, thereby forming a sealed hollow annular condenser unit. The deflectable conductive wall 74 is spatially separated from the stationary conductive member 70 to define with the latter an annular dielectric chamber 78. While air is the dielectric used in the embodiment shown in Figure 4, other insulating materials may be substituted if desired. Annular air spaces 80 and 82 are shown as provided above the upper and lower edges respectively of the stationary conductive member 70 to insulate it from the metallic end walls of the condenser.

The annular condenser unit 62 is mounted within a spark plug bore 22 by securing the outer sleeve 64 to the recessed inner surface 36 of the lower portion of the shell wall by silver soldering or other suitable means.

An opening 84 in the outwardly projecting flange 76 of the deflectable condenser wall 74 is provided for receiving the coaxial cable 52. The inner conductive core or wire 54 of this coaxial cable has its end secured to the stationary condenser member 70 by silver soldering or other appropriate means, while the outer tubular member 58 of the cable is connected to the deflectable condenser wall 74.

The annular condenser formed by the stationary conductive member 70, the deflectable conductive wall 74 and the dielectric chamber 78 is responsive to the pressure variations to which it is subject. Capacitance of the condenser varies directly with the pressure since the deflectable conductive wall functions as a diaphragm actuated by pressure changes for movement relative to the stationary conductive member.

This annular type of condenser is advantageous in that a very large area of the deflectable condenser wall is exposed to the expanding gases, resulting in a pressure-measuring device of great sensitivity. Such a device is highly accurate and not easily subject to outside disturbances affecting its accuracy.

The electric capacity of the indicator, due to the separation of the condenser plates, as shown, may be part of the tuned circuit in an oscillograph detector unit. Any variation of capacity in the indicator caused by deflection of the diaphragmatic conductive member will change the tuning of the indicator circuit and thus alter its response to a constant frequency generated by a stable oscillator. Any change of response may be amplified before it is passed to a viewing or recording oscillograph in known manner.

While the described embodiment of the present invention constitutes a preferred form, it is to be understood that other forms might be adopted, all coming within the scope of the following claims.

I claim:

1. An indicator unit for simultaneously firing an internal combustion engine and measuring pressure changes therein, comprising a spark plug having an outer shell for mounting in said engine and, positioned within the bore of said shell, a pressure-sensitive condenser including electrical conductive members separated by an interjacent elastic dielectric, said conductive members being exposed to the pressure to be measured and deflectable relative to one another for varying the capacitance of said condenser as a measure of such pressure.

2. A pressure-indicating unit for simultaneously firing an internal combustion engine and measuring pressure variations therein, comprising a spark plug provided with an outer shell for mounting in said engine, a fixed conductive member mounted in the bore of said spark plug shell, a diaphragmatic conductive member capacitively associated with said fixed conductive member, said diaphragmatic member being deflectable by the cylinder pressure to which the condenser is exposed for varying the degree of separation of said members and hence the electrical capacity of the unit, said members being adapted to be connected with means for supplying electrical current to said members and measuring capacitance changes resulting from pressure variations.

3. The combination of a spark plug and a pressure indicator of the electrical capacity type for simultaneously firing an internal combustion engine and measuring pressure variations therein, comprising an electric condenser mounted within the bore of the spark plug and exposed to the pressure effects of combustion gases, said condenser including concentrically arranged relatively deflectable conductive members separated by an annular elastic dielectric, the degree of separation of said members and hence the capacity of the condenser depending upon the extent of the relative deflection of the conductive members by the pressure to be measured.

4. A pressure-indicating device of the electrical capacity type for measuring pressure variations in a fluid, comprising an outer tubular conductive member, a stationary conductive rod member centrally located within said tubular member, and an elastic dielectric interjacent said conductive members, the side walls of the tubular conductive member being deflectable by changes in pressure for causing the resultant change in distance between said conductive members to vary the capacitance of the device, said device being adapted for electrical connection with means for measuring capacitance changes.

5. The combination with a spark plug having an outer shell defining a cylindrical bore of a pressure-measuring condenser positioned within the bore and exposed to pressure variations in an internal combustion engine, said condenser being adapted to electrically communicate through an opening in said shell with capacitance-measuring means and comprising a deformable tubular conductive member, a stationary conductive member positioned within said tubular member, and an elastic dielectric interjacent the deformable tubular member and the stationary member.

6. In a spark plug having an outer shell adaptable for insertion into the head of an internal combustion engine, a pressure-indicating condenser positioned within said shell and electrically communicating through an opening in the shell wall with means for measuring capacitance changes, said condenser comprising a stationary conductive rod, a tubular conductive member having deflectable walls concentrically encasing said stationary rod, and a generally annular elastic dielectric interjacent said conductive members, said deflectable walls being exposed to the pressure effects of combustion gases and adapted to be flexed thereby for varying the capacitance of said condenser.

7. A pressure-indicating pickup of the electrical capacitance type comprising an inner electrically conductive rod, a tubular casing enclosing said rod and spaced therefrom, and an elastic dielectric interjacent the rod and the casing, said casing being deformable with changes in pressure for causing the resultant change in distance between the rod and casing to vary the capacitance of the pickup, said pickup being helically coiled to expose a large outer surface area of the tubular casing to the compressive effects of the pressure to be measured.

8. An pressure-indicating unit for simultaneously firing an internal combustion engine and measuring pressure variations therein, comprising a spark plug having a hollow shell, a pressure-indicating condenser positioned within said shell and communicating through an opening in the shell wall with electrical means for measuring capacitance changes, said condenser comprising a deformable tubular conductive member, a stationary conductive member positioned within said deformable member, and an interjacent dielectric separating said conductive members, said condenser being coiled within said shell to expose a large surface area of the deformable tubular member to pressure changes caused by the combustion gases of the engine.

9. In a spark plug having an outer shell with a cylindrical bore and an insulator encasing a central electrode positioned within said bore, a pressure-indicating condenser mounted within said bore and helically coiled around the downwardly extending lower portion of said insulator, said condenser comprising a central metallic wire, a metallic tubular casing having generally cylindrical pressure-deflectable walls enclosing said wire and substantially concentric therewith and exposed to the pressure effects of expanding gases, and a generally annular elastic dielectric separating said wire from said casing, said condenser having electric connections extending through the shell wall for communication with means for measuring changes in capacitance.

10. A device for simultaneously firing an internal combustion engine and measuring pressure changes therein comprising a spark plug having an outer shell defining a bore exposed to the pressure effects of combustion gases, a pressure indicator of the variable capacitance type including an annular fixed conductive member mounted within said bore and insulated from said shell, and an annular conductive member positioned within and separated from said fixed conductive member and having walls deflectable by combustion gas pressure, said conductive members defining an interjacent dielectric chamber, the ends of said chamber being sealed for preventing the entrance of gases therein, said conductive members having electrical connections extending through the shell wall for communication with means for measuring changes in capacitance.

11. A unit for simultaneously firing an internal combustion engine and measuring combustion pressure changes therein comprising a spark plug having a bore defined by an outer shell, a pressure-indicating electrical condenser including a generally cylindrical fixed conductive member mounted within said bore and secured to but insulated from the walls of the shell, a deflectable conductive wall member concentrically positioned within and separated from said fixed conductive member and exposed to the pressure effects of combustion gases, said wall member having its edges secured to the shell, and an elastic dielectric radially separating said conductive members, the ends of the condenser being sealed for preventing the entrance of gases into said condenser, and means communicating through an opening in the spark plug shell for electrically connecting the condenser with a capacitance-measuring device.

ALBERT F. WELCH.

REFERENCES CITED

The following references are of record in the file of this patent:

UNITED STATES PATENTS

| Number | Name | Date |
| --- | --- | --- |
| 1,960,317 | Rabezzena | May 29, 1934 |
| 2,096,826 | Schrader | Oct. 26, 1937 |
| 2,164,638 | Broeze | July 4, 1939 |
| 2,250,471 | De Bruin | July 29, 1941 |